US010619587B2

(12) United States Patent
Haga et al.

(10) Patent No.: US 10,619,587 B2
(45) Date of Patent: Apr. 14, 2020

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hiroyuki Haga, Numazu (JP); Kei Takachiho, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 42 days.

(21) Appl. No.: 15/964,374

(22) Filed: Apr. 27, 2018

(65) Prior Publication Data

US 2018/0313286 A1    Nov. 1, 2018

(30) Foreign Application Priority Data

Apr. 28, 2017   (JP) ................. 2017-089956

(51) Int. Cl.
| | |
|---|---|
| *F02D 41/14* | (2006.01) |
| *F02M 26/47* | (2016.01) |
| *F02D 41/00* | (2006.01) |
| *F02D 41/18* | (2006.01) |
| *F02D 35/02* | (2006.01) |
| *F02M 26/06* | (2016.01) |

(52) U.S. Cl.
CPC ..... *F02D 41/1486* (2013.01); *F02D 41/0055* (2013.01); *F02D 41/0085* (2013.01); *F02D 41/18* (2013.01); *F02M 26/47* (2016.02); *F02D 35/02* (2013.01); *F02D 2200/021* (2013.01); *F02D 2200/0406* (2013.01); *F02D 2200/0418* (2013.01); *F02M 26/06* (2016.02)

(58) Field of Classification Search
CPC combination set(s) only.
See application file for complete search history.

(56) References Cited

U.S. PATENT DOCUMENTS

| | | | | |
|---|---|---|---|---|
| 8,051,659 | B2* | 11/2011 | Yamashita | .......... F02B 29/0418 |
| | | | | 123/568.11 |
| 10,202,923 | B2* | 2/2019 | Kim | .................. F02D 41/1461 |
| 10,288,012 | B2* | 5/2019 | Berkemeier | .......... F02M 26/35 |

(Continued)

FOREIGN PATENT DOCUMENTS

| | | |
|---|---|---|
| JP | 2009-24685 | 2/2009 |
| JP | 2013-194691 | 9/2013 |

*Primary Examiner* — Binh Q Tran
(74) *Attorney, Agent, or Firm* — Finnegan, Henderson, Farabow Garrett & Dunner, LLP

(57) ABSTRACT

Provided is a control device for an internal combustion engine equipped with at least one cylinder, an EGR device, and an actuator that is used for control of an engine control parameter that affects the combustion stability. The control device is configured to: perform, if a condensed water occurrence condition is met, a particle size estimation processing that estimates the particle size of the condensed water that flows into the at least one cylinder from the intake channel; and perform, if the condensed water occurrence condition is met, a correction processing that corrects the engine control parameter so as to improve the combustion stability. In the correction processing, the control device more increases a correction amount of the engine control parameter when the particle size estimated by the particle size estimation processing is greater.

5 Claims, 9 Drawing Sheets

(56) References Cited

U.S. PATENT DOCUMENTS

| | | | |
|---|---|---|---|
| 10,323,605 B2* | 6/2019 | Miller | F02B 47/02 |
| 10,358,998 B2* | 7/2019 | Dudar | F02D 41/222 |
| 2014/0069369 A1* | 3/2014 | Pendray | F01B 1/12 |
| | | | 123/25 C |

* cited by examiner

CONTROL DEVICE FOR INTERNAL COMBUSTION ENGINE

CROSS-REFERENCE TO RELATED APPLICATION

This application is based on and claims the benefit of Japanese Patent Application No. 2017-089956, filed on Apr. 28, 2017, which is incorporated by reference herein in its entirety.

BACKGROUND

Technical Field

The present disclosure relates to a control device for an internal combustion engine, and more particularly to a control device for controlling an internal combustion engine in which a part of exhaust gas that flows through an exhaust channel is introduced, as an EGR gas, into an intake channel via an EGR channel.

Background Art

For example, JP 2009-024685 A discloses a control device for an internal combustion engine. According to this internal combustion engine, a part of exhaust gas that flows through an exhaust channel is introduced, as an EGR gas, into an intake channel via an EGR channel.

This control device is configured to estimate the amount of condensed water that flows into a part of cylinders from the intake channel along with intake air, and control the value of a combustion control parameter such that an engine torque generated at the part of cylinders mentioned above becomes higher when an estimated amount of the condensed water is greater.

SUMMARY

As a result of earnest study, the inventors have found that, the effects, on combustion, of condensed water that flows into a cylinder from an intake channel differ depending on the particle size of the condensed water that flows into the cylinder. In view of this finding, in order to ensure a favorable combustion stability in a condensed water occurrence condition, it is required to improve engine control such that the effects of the particle size of the condensed water that changes during operation of the internal combustion engine is taken into consideration.

The present disclosure has been made to address the problem described above, and an object of the present disclosure is to provide a control device for an internal combustion engine that can ensure a favorable combustion stability in a condensed water occurrence condition.

A control device for controlling an internal combustion engine according to one aspect of the present disclosure is configured to control an internal combustion engine that includes:

at least one cylinder;

an EGR device that includes an EGR channel configured to connect an intake channel and an exhaust channel; and an actuator used for control of an engine control parameter that affects combustion stability of the internal combustion engine, wherein the control device is configured to:

perform, if a condensed water occurrence condition in which a condensed water occurs in at least one of the intake channel and the EGR channel is met, a particle size estimation processing that estimates a particle size of the condensed water that flows into the at least one cylinder from the intake channel; and perform, if the condensed water occurrence condition is met, a correction processing that corrects the engine control parameter so as to improve the combustion stability, and wherein, in the correction processing, the control device more increases a correction amount of the engine control parameter when the particle size estimated by the particle size estimation processing is greater.

In the particle size estimation processing, the control device may estimate that the particle size is greater when a flow velocity of intake gas that flows through a point of occurrence of the condensed water is lower.

In the particle size estimation processing, the control device may estimate that the particle size is greater when a difference between a dew point of intake gas that flows through a point of occurrence of the condensed water and a wall surface temperature of the point of occurrence is greater.

The at least one cylinder may include a plurality of cylinders. If the condensed water occurrence condition is met, the control device may perform processing to estimate, for each cylinder, an amount of the condensed water that flows into each of the plurality of cylinders from the intake channel. Furthermore, in the correction processing, the control device may more increase the correction amount in one or more cylinders in which the estimated amount of the condensed water is greater, as compared to that in one or more cylinders in which the estimated amount of the condensed water is smaller.

A control device for controlling an internal combustion engine according to another aspect of the present disclosure is configured to control an internal combustion engine that includes:

at least one cylinder;

an EGR device that includes an EGR channel configured to connect an intake channel and an exhaust channel; and an actuator used for control of an engine control parameter that affects combustion stability of the internal combustion engine, wherein, if a condensed water occurrence condition in which a condensed water occurs in at least one of the intake channel and the EGR channel is met, the control device more increases a correction amount for correcting the engine control parameter so as to improve the combustion stability when a flow velocity of intake gas that flows through a point of occurrence of the condensed water is lower.

According to the control device for an internal combustion engine of one aspect of the present disclosure, if the condensed water occurrence condition is met, the correction amount for correcting the engine control parameter so as to improve the combustion stability is more increased when the particle size of the condensed water estimated by the particle size estimation processing is greater. The greater the particle size of condensed water that flows into a cylinder from an intake channel is, the greater the effects of the condensed water on the combustion stability becomes. Thus, according to this aspect of the present disclosure, an engine control in which the particle size of the condensed water that flows into at least one cylinder from the intake channel is taken into consideration can be performed. As a result, a favorable combustion stability can be ensured in the condensed water occurrence condition.

Moreover, according to another aspect of the present disclosure, if the condensed water occurrence condition is met, the correction amount for correcting the engine control parameter so as to improve the combustion stability is more increased when the flow velocity of intake gas that flows through a point of occurrence of the condensed water is lower. The particle size of the condensed water that flows into at least one cylinder from the intake channel becomes easier to be greater when the flow velocity of this intake gas is greater. Thus, according to this aspect of the present disclosure, an engine control in which the particle size of the condensed water that flows into at least one cylinder from the intake channel is taken into consideration can also be performed. As a result, a favorable combustion stability can be ensured in the condensed water occurrence condition.

DETAILED DESCRIPTION

In the following, embodiments of the present disclosure are described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Figure 1:
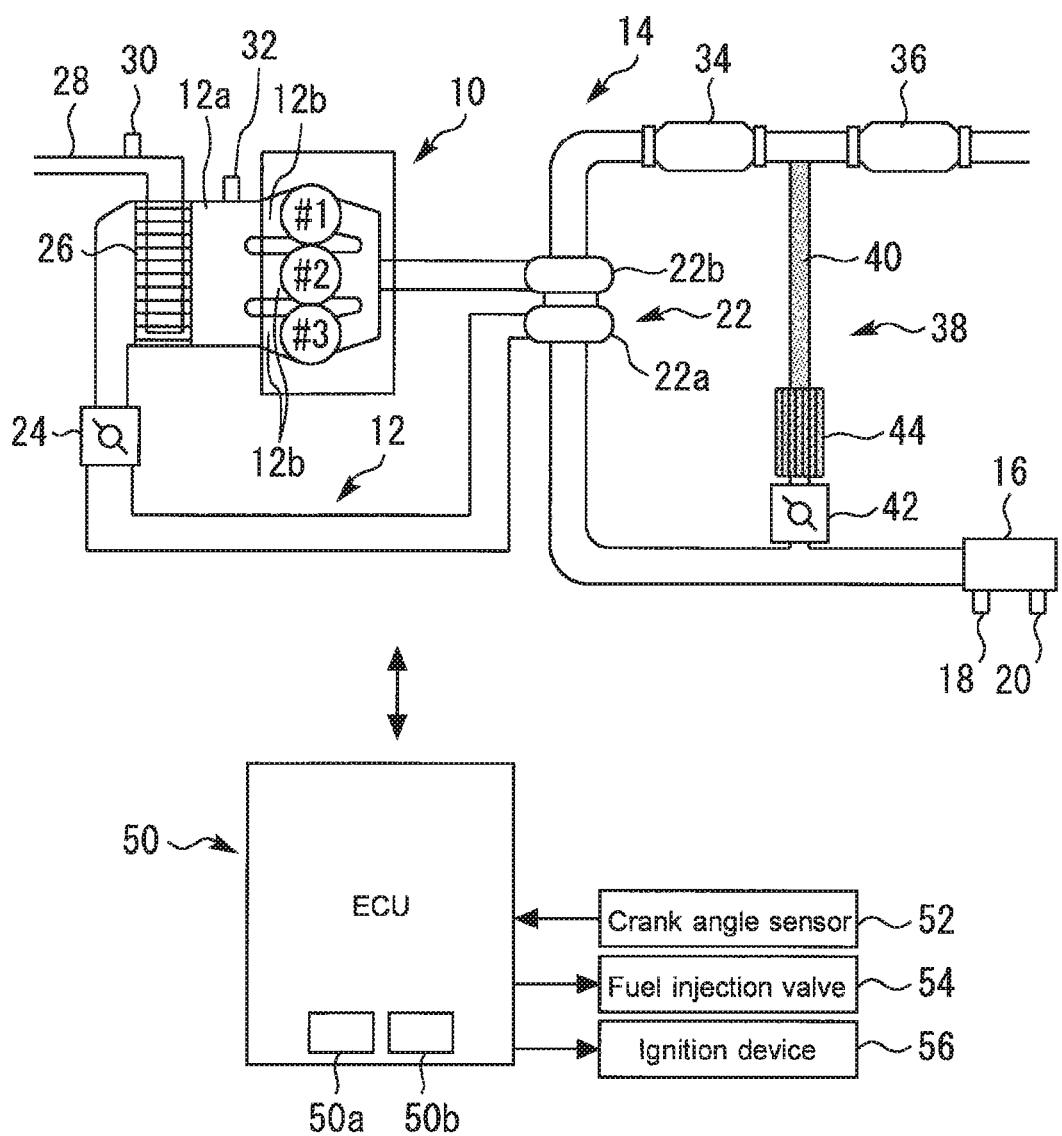
FIG. 1 is a diagram for describing a system configuration according to a first embodiment of the present disclosure.

First, a first embodiment according to the present disclosure will be described with reference to FIGS. 1 to 7.
1. System Configuration According to First Embodiment FIG. 1 is a diagram for describing a system configuration according to the first embodiment of the present disclosure. The system shown in FIG. 1 includes a spark-ignition type internal combustion engine 10. Although the internal combustion engine 10 is, as an example, an in-line three cylinder engine, the number of cylinders of internal combustion engines according to the present disclosure may alternatively one, or plural other than three. An intake channel 12 and an exhaust channel 14 communicate with each cylinder of the internal combustion engine 10.
1-1. Configuration Around Intake Channel An air cleaner 16 is provided in the vicinity of an inlet of the intake channel 12. An air flow sensor 18 that outputs a signal responsive to the flow rate of air (fresh air) taken into the intake channel 12 and a humidity sensor 20 that outputs a signal responsive to the humidity of this air are attached to the air cleaner 16.

The internal combustion engine 10 is provided with a turbo-supercharger 22 as one example of a supercharger for supercharging intake air. In a portion of the intake channel 12 located on the downstream side of the air cleaner 16, a compressor 22a of the turbo-supercharger 22 is installed.

In a portion of the intake channel 12 located on the downstream side of the compressor 22a, an electronically controlled throttle valve 24 is arranged. An intake manifold 12a is provided on the downstream side of the throttle valve 24. A channel in the intake manifold 12a serves as a part of the intake channel 12.

In a collective portion (a surge tank) of the intake manifold 12a, an intercooler 26 for cooling intake gas compressed by the compressor 22a is installed. The intercooler 26 is of a water-cooled type, and includes a water pump and a radiator that are not shown in the drawings as well as a cooling water flow channel 28 (only a part of which is illustrated in FIG. 1). To be more specific, the intercooler 26 is configured such that cooler-cooling water that is lower in temperature than engine cooling water for cooling an engine main body (at least including a cylinder block) circulates through the cooling water flow channel 28. It should be noted that the intercooler 26 may be arranged on the upstream side of the throttle valve 24, instead of the example described above.

Moreover, a cooler water temperature sensor 30 that outputs a signal responsive to the temperature of the cooler-cooling water that flows through the inside of the cooling water flow channel 28 is attached thereto. Furthermore, an intake pressure sensor 32 that outputs a signal responsive to the pressure of the intake gas (surge tank pressure Pim) is attached to the collective portion (surge tank) of the intake channel 12 located on the downstream side of the intercooler 26.
1-2. Configuration Around Exhaust Channel In the exhaust channel 14, a turbine 22b of the turbo-supercharger 22 is installed. An upstream-side catalyst 34 and a downstream-side catalyst 36 are installed in series in the exhaust channel 14 at portions located on the downstream side of the turbine 22b in order to purify exhaust gas.

1-3. EGR Device

The internal combustion engine 10 shown in FIG. 1 is provided with an EGR device 38. The EGR device 38 includes an EGR channel 40, an EGR valve 42 and an EGR cooler 44. The EGR channel 40 connects the exhaust channel 14 with the intake channel 12 at a portion located on the upstream side of the intercooler 26. In more detail, the EGR channel 40 connects the intake channel 12 at a portion located on the upstream side of the compressor 22a with the exhaust channel 14 at a portion located on the downstream side of the turbine 22b. That is, the EGR device 38 is of a low pressure loop (LPL) type. In further addition to this, the EGR channel 40 is connected to the exhaust channel 14 at the portion between the upstream-side catalyst 34 and the downstream-side catalyst 36. The EGR valve 42 is, as an example, electrically driven, and is installed in the EGR channel 40 to open and close the EGR channel 40. The EGR cooler 44 is of a water-cooled type, and cools EGR gas that flows through the EGR channel 40.

Since, if the EGR valve 42 is closed, the EGR gas is not introduced into the intake channel 12, intake air thus corresponds to "intake gas" that passes through the compressor 22a. If, on the other hand, the EGR valve 42 is open, mixed gas of the intake air (fresh air) and the EGR gas corresponds to the "intake gas" that passes through the compressor 22a. According to the EGR device 38 described above, the flow rate of the EGR gas that flows through the EGR channel 40 is controlled with adjustment of the opening degree of the EGR valve 42 and, as a result, an EGR rate can be controlled. The EGR rate refers to the ratio of the amount of the EGR gas with respect to the amount of the intake gas (the mixed gas described above) that flows into the cylinders.

1-4. Configuration of Control System

The system according to the present embodiment further includes an electric control unit (ECU) 50. Various sensors installed in the internal combustion engine 10 and the vehicle on which the internal combustion engine 10 is mounted and various actuators for controlling the operation of the internal combustion engine 10 are electrically connected to the ECU 50.

The various sensors described above include a crank angle sensor 52 that outputs a signal responsive to a crank angle, as well as the air flow sensor 18, the humidity sensor 20, the cooler water temperature sensor 30 and the intake pressure sensor 32 that are described above. The ECU 50 can obtain an engine speed by the use of the crank angle sensor 52. Moreover, the various actuators described above include fuel injection valves 54 and an ignition device 56 as well as the throttle valve 24 and the EGR valve 42 described above. The fuel injection valves 54 are, for example, in-cylinder injection valves which are provided for the respective cylinders, and each of which injects fuel into the cylinder directly. The ignition device 56 uses a spark plug (not shown in the drawings) provided for each cylinder to ignite an air-fuel mixture in each cylinder.

The ECU 50 includes a processor 50a, a memory 50b, and an input/output interface. The input/output interface receives sensor signals from the various sensors described above, and outputs actuating signals to the various actuators described above. In the memory 50b, various control programs and maps for controlling the various actuators are installed. The processor 50a reads out a control program from the memory and executes the control program. Thus, a function of the "control device for an internal combustion engine" according to the present embodiment is achieved.

2. Problem on Occurrence of Condensed Water 2-1. Occurrence of Condensed Water

In order to improve the thermal efficiency of the internal combustion engine 10, it is effective to increase the EGR rate. However, during the EGR gas being introduced into the intake channel 12, if the mixed gas of the fresh air and the EGR gas is cooled in the intercooler 26 to its dew point or lower of the mixed gas, condensed water is produced in an internal intake channel 12c (see FIGS. 4A and 4B described later) that is a portion of the intake channel 12 located inside the intercooler 26. Also, if a large amount of the EGR gas is introduced associated with an increase of the EGR rate, the amount of the condensed water that is produced becomes greater.

Figure 2:
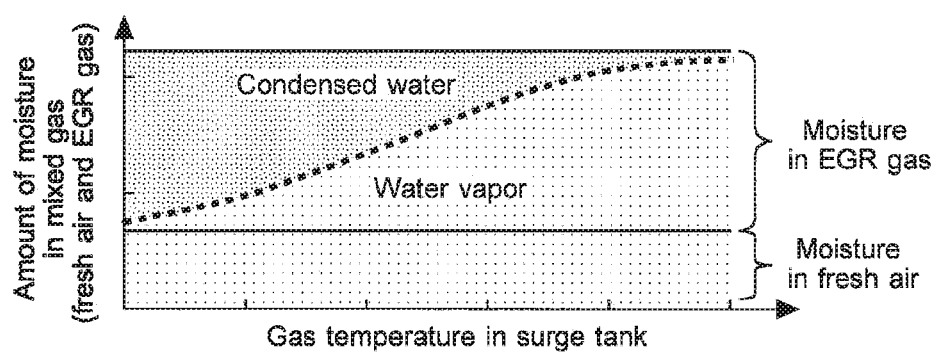
FIG. 2 is a graph that illustrates a relationship between the amount of moisture in mixed gas of fresh air and EGR gas, and the gas temperature in a surge tank.

FIG. 2 is a graph that illustrates a relationship between the amount of moisture in the mixed gas of the fresh air and the EGR gas, and the gas temperature in the surge tank. In more detail, FIG. 2 represents the relationship at a precondition at which the flow rate and temperature of the mixed gas that flows into the intercooler 26 and the EGR rate are constant.

A lower gas temperature in the surge tank (that is, a lower temperature of the mixed gas immediately after passing through the intercooler 26) means that the mixed gas is more cooled by the intercooler 26. If the flow rate of the mixed gas and the EGR rate are constant as with the precondition described above, the amount of moisture in the whole mixed gas becomes constant without depending on the gas temperature in the surge tank. On that basis, if the gas temperature in the surge tank is lower (that is, if the mixed gas is more cooled by the intercooler 26), the amount of a liquefied moisture of the whole moisture included in the mixed gas becomes greater. Thus, as shown in FIG. 2, the ratio of the amount of the condensed water with respect to the amount of water vapor in the whole moisture included in the mixed gas becomes higher when the gas temperature in the surge tank becomes lower. It should be noted that, under the gas temperature in the surge tank in a condition in which the mixed gas is not cooled to its dew point or lower, the moisture in the mixed gas is not condensed water but water vapor.

2-2. Effects of Particle Size of Condensed Water on Combustion Fluctuation (Combustion Stability)

Figure 3:
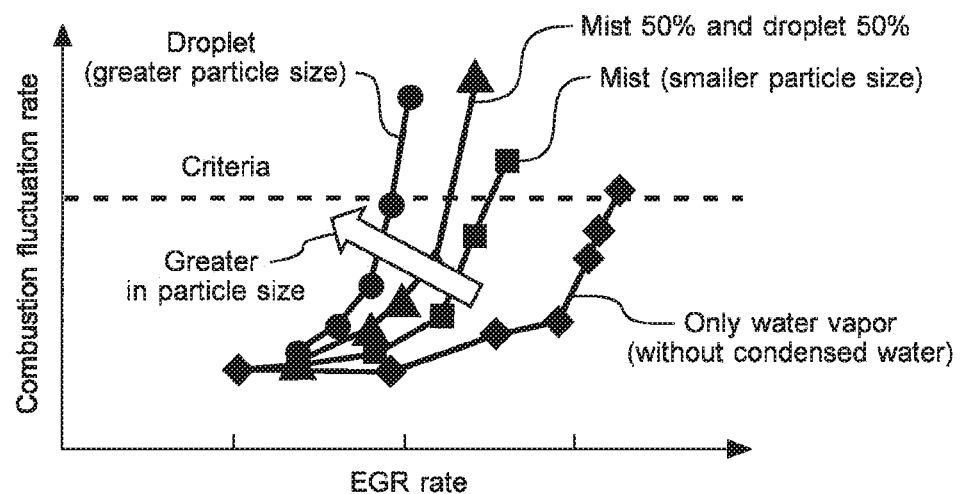
FIG. 3 is a graph that illustrates the effects of the particle size of condensed water with respect to a combustion fluctuation rate and an EGR rate.

FIG. 3 is a graph that illustrates the effects of the particle size of the condensed water with respect to a combustion fluctuation rate and the EGR rate. The combustion fluctuation rate that is the vertical axis of FIG. 3 is an index that indicates the magnitude of the combustion fluctuation of the internal combustion engine 10 among a predetermined number of combustion cycles. In FIG. 3, four characteristic lines are represented. A line with rhombuses of them corresponds to an example of mixed gas including only water vapor (i.e., without condensed water). The remaining three lines correspond to examples of mixed gases including condensed waters. In more detail, the line with squares corresponds to an example of mixed gas including condensed water in a mist fashion (i.e., condensed water of a smaller particle size). The line with circles corresponds to an example of mixed gas including condensed water in a droplet fashion (i.e., condensed water of a greater particle size). The line with triangles corresponds to an example of mixed gas including condensed water in which each percentage of a misty condensed water represented by the squares and a droplet-like condensed water represented by the circles is 50 percent. Thus, the particle sizes of the condensed waters in the three lines concerning the mixed gases including the condensed waters become greater in the order of the squares (mist), the triangles (mist 50% and droplet 50%) and the circles (droplet) (squares<triangles<circles).

In any of four characteristic lines shown in FIG. 3, if the EGR rate becomes higher, the combustion fluctuation rate becomes higher due to a decrease of the combustion stability in association with the increase of the EGR rate. However, these four lines are different from each other in terms of manners of the increase of the combustion fluctuation rate in association with the increase of the EGR rate. That is, under the same EGR rate, the combustion fluctuation rate of the mixed gas with the rhombuses without condensed water becomes the lowest. Also, with respect to three lines of the mixed gases including the condensed waters, under the same EGR rate, the combustion fluctuation rate becomes greater when the particle size of the condensed water is greater. In other words, according to the examples of the mixed gases including the condensed waters, the EGR rate at which the combustion fluctuation rate reaches a predetermined criteria (which is equivalent to a combustion limit) become lower (that is, the combustion resistance in association with the introduction of the EGR gas becomes lower) as compared to the mixed gas including only water vapor (without the condensed water). Moreover, the greater the particle size of the condensed water is, the EGR rate at which the combustion fluctuation rate reaches the criteria described above becomes lower.

(Cause of Change of Combustion Fluctuation Rate Due to Particle Size of Condensed Water)

It is conceivable that the reason why the combustion fluctuation becomes greater (that is, the combustion stability becomes lower) when the particle size of the condensed water is greater is that the uniformity of a condensed water density distribution around a spark plug in a cylinder affects the combustion resistance. To be more specific, according to the results of examination made by the inventors, the inventors have found that, in the mixed gas including condensed water in a droplet fashion (i.e., condensed water of a greater particle size), the condensed water is easier to be unevenly distributed wholly in the cylinder and the variation of the distribution between combustion cycles is grater, as compared to the mixed gas including condensed water in a mist fashion (i.e., condensed water of a smaller particle size). Moreover, If the distribution of the condensed water in the cylinder becomes uneven due to the particle size of the condensed water being greater and the distribution varies between combustion cycles, the possibility that condensed water of a greater particle size is present in the vicinity of the spark plug becomes higher. As a result, the flame propagation is impeded by the condensed water near the spark plug, and thus, the number of combustion cycles in which combustion deteriorates including the occurrence of misfire becomes greater. The combustion fluctuation rate therefore becomes higher.

Figure 4A:
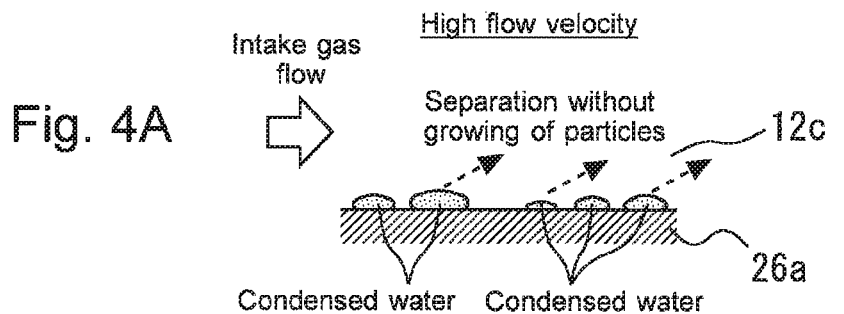
FIGS. 4A and 4B are diagrams for describing the effects, on the particle size of the condensed water, of an intake air flow velocity and a temperature difference Δt.
Figure 4B:
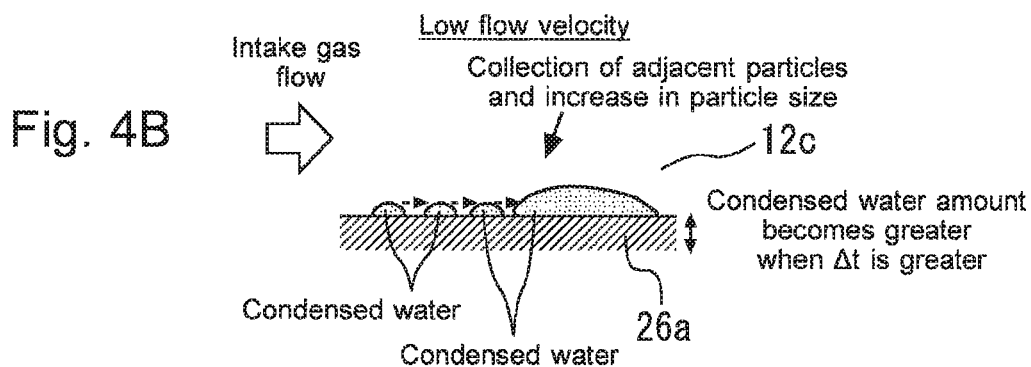

3. Engine Control According to First Embodiment in Condensed Water Occurrence Condition 3-1. Estimation of Particle Size of Condensed Water FIGS. 4A and 4B are diagrams for describing the effects, on the particle size of the condensed water, of the intake air flow velocity and a temperature difference $\Delta t$. In more detail, FIG. 4A indicates a behavior of the particles of the condensed water obtained when the intake air flow velocity is high, and FIG. 4B indicates a behavior of the particles of the condensed water obtained when the intake air flow velocity is low. In should be noted that the intake air flow velocity mentioned here refers to the flow velocity of the intake gas (i.e., the mixed gas of the fresh air and the EGR gas) that flows through the internal intake channel 12c of the intercooler 26 that is the point of occurrence of the condensed water. Also, the temperature difference $\Delta t$ corresponds to a difference between the dew point td of the intake gas that flows through the internal intake channel 12c and the temperature of an wall surface 26a of the internal intake channel 12c.

First, during the flow velocity of the intake gas being high, a time required for the intake gas (the mixed gas) to passes through the intercooler 26 is short. Thus, as shown in FIG. 4A, the particles of the condensed water that is produced at the wall surface 26a of the internal intake channel 12c and attached to the wall surface 26a become easy to be separated from the wall surface 26a without growing. On the other hand, the flow velocity of the intake gas being low, the time described above is long. Thus, the cooling time of the intake gas in the intercooler 26 becomes longer, and, as shown in FIG. 4B, the adjacent particles of the condensed water that are attached to the wall surface 26a become easy to collect. As a result of this, the particles of the condensed water becomes easy to grow. Therefore, the lower the flow velocity of the intake gas is, the greater the particle size of the condensed water becomes.

Moreover, the greater the temperature difference $\Delta t$ is, the greater the amount of the condensed water that is produced on the wall surface 26a of the intercooler 26 becomes. If the amount of the condensed water is greater, the particles adjacent to each other become easy to collect. Thus, the particle size becomes easy to be greater when the temperature difference $\Delta t$ is greater.

Figure 5:
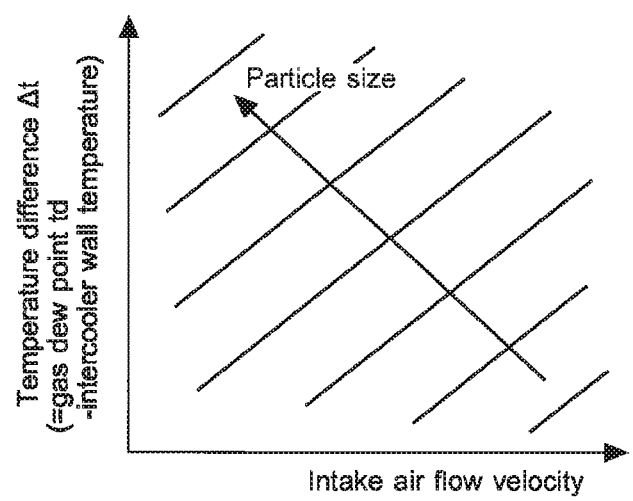
FIG. 5 is a graph that illustrates a relationship of the particle size of the condensed water with respect to the intake air flow velocity and the temperature difference Δt.

FIG. 5 is a graph that illustrates a relationship of the particle size of the condensed water with respect to the intake air flow velocity and the temperature difference $\Delta t$. Based on the finding described with reference to FIGS. 4A and 4B, the relationship of the particle size with respect to the intake air flow velocity and the temperature difference $\Delta t$ can be represented as shown in FIG. 5. That is, the particle size of the condensed water becomes greater when the intake air flow velocity is lower, and it also becomes greater when the temperature difference $\Delta t$ is greater. It should be noted that the relationship shown in FIG. 5 is obtained in advance by experiment, for example. Thus, by storing this kind of relationship as a map, the ECU 50 can estimate the particle size of the condensed water, during operation of the internal combustion engine 10, on the basis of the intake air flow velocity and the temperature difference $\Delta t$. In more detail, values of the particle size obtained from the relationship shown in FIG. 5 correspond to the level values of the particle size, which mean that, when this value is greater, the condensed water having a greater particle size is included.

3-2. Outline of Engine Control at Condensed Water Occurrence Condition

In the present embodiment, in order to reduce a decrease of the combustion stability (i.e., to reduce an increase of the combustion fluctuation) due to an inflow of the condensed water from the intake channel 12 to each cylinder, the following engine control is performed when a condensed water occurrence condition is met. That is, the EGR rate that is one example of an engine control parameter that affects the combustion stability is corrected in accordance with the amount and particle size of the condensed water.

To be more specific, the ECU 50 calculates a target EGR rate corresponding to the target value of EGR rate control, as a final EGR rate, by subtracting, from a base EGR rate corresponding to the base value of the target EGR rate, a correction amount depending on the amount and particle size of the condensed water. The ECU 50 stores a base EGR rate map (not shown in the drawings) that defines a relationship between the engine load and engine speed, and the base EGR rate. The base EGR rate is calculated, as a value depending on the engine load and the engine speed, from this kind of map.

3-2-1. Correction Depending on Amount of Condensed Water

As described above with reference to FIG. 3, at the same EGR rate, if the intake gas (i.e., the mixed gas of the fresh air and the EGR gas) includes the condensed water, the combustion fluctuation becomes greater as compared to the mixed gas including only the water vapor (that is, without the condensed water). Accordingly, in the present embodiment, if the condensed water occurrence condition is met, the EGR rate is corrected so as to be lower when the amount of the condensed water that can be estimated in, for example, a manner described later (see step S102) is greater.

Figure 6:
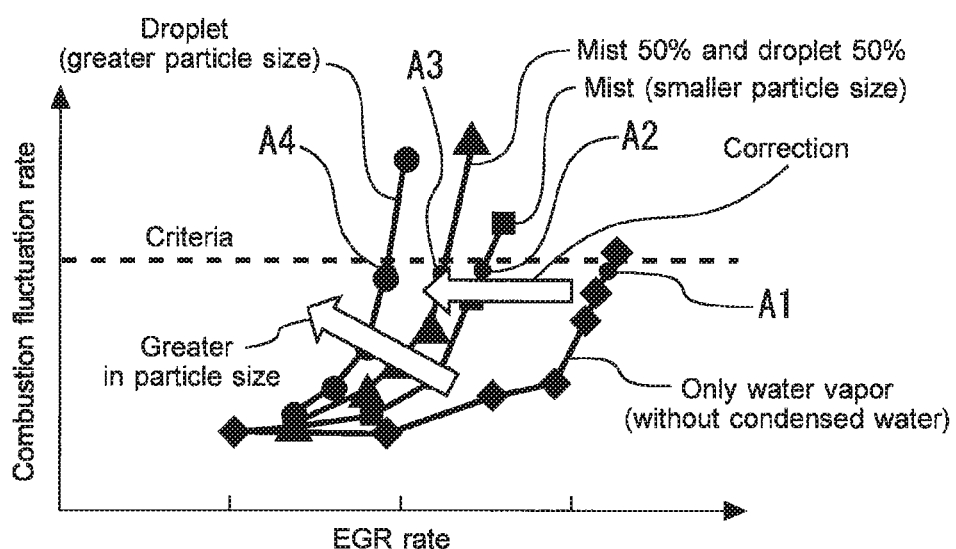
FIG. 6 is a graph for describing a determination manner of a correction amount of the EGR rate according to the particle size of the condensed water.

3-2-2. Engine Control with Particle Size of Condensed Water Taken into Consideration FIG. 6 is a graph for describing a determination manner of the correction amount of the EGR rate according to the particle size of the condensed water. As with FIG. 3, FIG. 6 shows the effects of the particle size of the condensed water with respect to the combustion fluctuation rate and the EGR rate. It should be noted that the individual characteristic lines shown in FIG. 6 are associated with the same engine load and engine speed. If the engine load or the engine speed changes, relative relationships among four characteristic lines do not change, although the characteristic lines become different from each other.

As described above with reference to FIG. 3 and also represented in FIG. 6, at the same EGR rate, the greater the particle size of the condensed water is, the greater the combustion fluctuation becomes. The base EGR rate is determined such that, under a condition in which the condensed water is not produced, the EGR rate can be increased, as possible, within a range in which the combustion fluctuation rate does not exceed a criteria in each of engine operating regions identified by the engine load and the engine speed. It can therefore be said, in the relationship shown in FIG. 6, that the value of the EGR rate at a point A1 that is located on the characteristic line with the rhombuses and located near the criteria corresponds to the base EGR rate.

If, the value of the EGR rate at the point A1 is used in a condition in which the condensed water in a mist fashion (i.e., the condensed water of a smaller particle size) is produced (the squares in FIG. 6), the combustion fluctuation rate exceeds the criteria. Thus, in order for the combustion fluctuation rate not to exceed the criteria in this condition, it is required to change the target EGR rate such that the value of the EGR rate at a point A2 located on the characteristic line with the circles is obtained. Therefore, in this condition, the difference obtained by subtracting the EGR rate at the point A2 from the EGR rate (i.e., the base EGR rate) at the point A1 corresponds to a required correction amount of the target EGR rate. Similarly, if the condensed water associated with the triangles (that is, the condensed water in which each percentage of mist and droplets are 50 percent) is produced, the difference obtained by subtracting the EGR rate at a point A3 from the EGR rate at the point A1 (i.e., the base EGR rate) corresponds to a required correction amount of the target EGR rate. Moreover, if the condensed water (droplets 100%) associated with the circles is produced, the difference obtained by subtracting the EGR rate at a point A4 from the EGR rate at the point A1 (i.e., the base EGR rate) corresponds to a required correction amount of the target EGR rate.

As described above, the correction amount (the amount of decrease) of the EGR rage required for the combustion fluctuation rate not to exceed the criteria becomes greater when the particle size of the condensed water is greater. Accordingly, in the present embodiment, if the condensed water occurrence condition is met, the target EGR rate is corrected so as to be lower when the particle size is greater.

Figure 7:
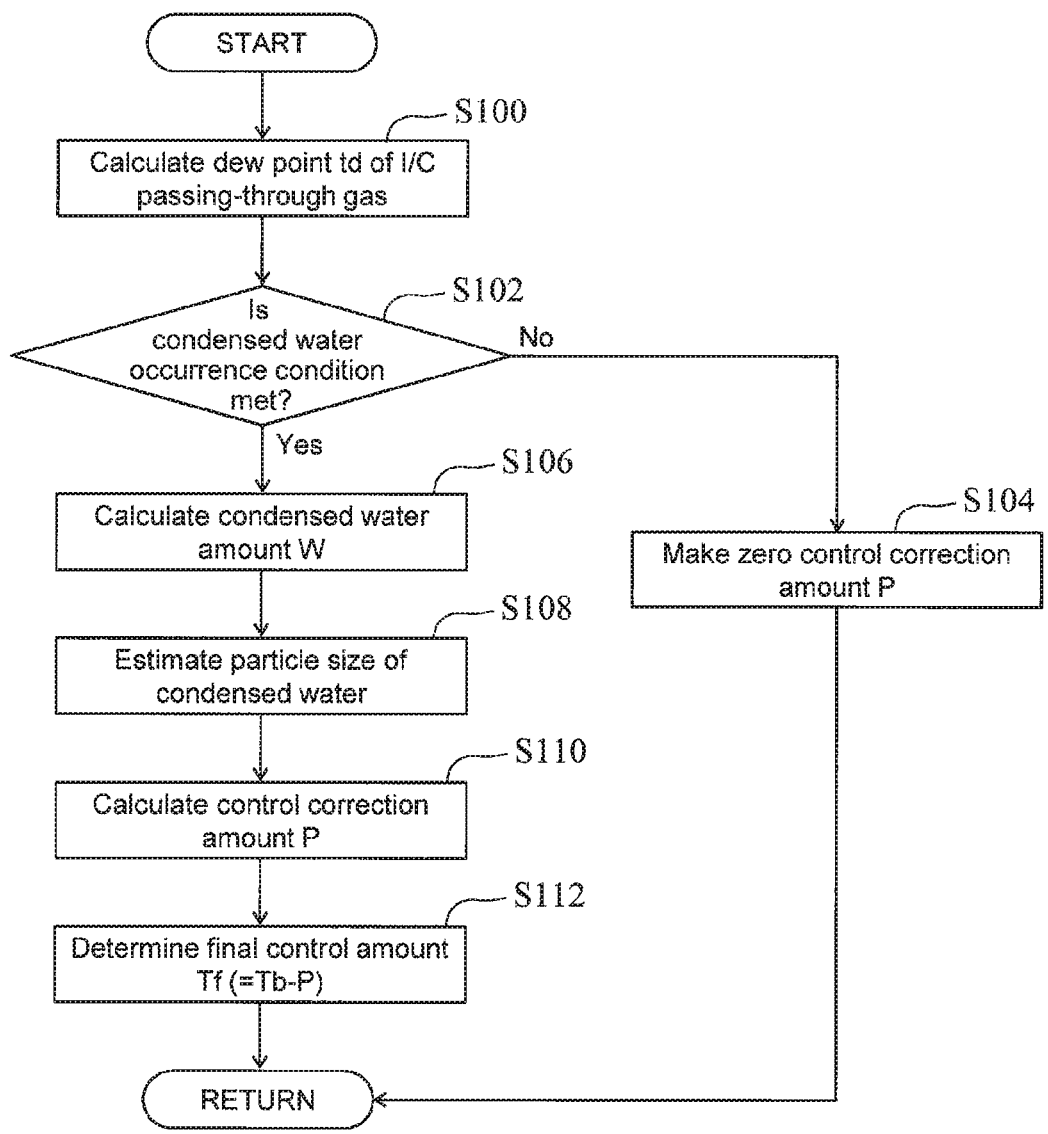
FIG. 7 is a flow chart that illustrates a routine of processing concerning an engine control according to the first embodiment of the present disclosure.

3-3. Processing of ECU Concerning Engine Control According to First Embodiment in Condensed Water Occurrence Condition FIG. 7 is a flow chart that illustrates a routine of the processing concerning the engine control according to the first embodiment of the present disclosure. It should be noted that the present routine is repeatedly executed at a predetermined control interval during an "engine operation with EGR" in which the EGR gas is introduced into the cylinders.

According to the routine shown in FIG. 7, first, the ECU 50 calculates the dew point td of the gas that passes through the intercooler 26 (i.e., I/C passing-through gas) (step S100). Since the internal combustion engine 10 is in the engine operation with EGR, this I/C passing-through gas is the mixed gas of the fresh air and the EGR gas, and the dew point td thereof can be calculated by the use of the following formula 1. Also, a water vapor partial pressure "e" of the mixed gas in formula 1 can be calculated by the use of the following formula 2.

$$td = 237.3 * \log\left(\frac{e}{0.611}\right) / \left(7.5 - \log\left(\frac{e}{0.611}\right)\right) \quad (1)$$

$$e = (Pim + CP) * Rmixw / 100 \quad (2)$$

Pim: Surge tank pressure
CP: Atmospheric air pressure
Rmixw: Ratio of molar flow rate of moisture in mixed gas To be more specific, the ratio Rmixw of the molar flow rate of the moisture in the mixed gas in formula 2 described above can be calculated by dividing, by the whole molar flow rate Gmixall of the mixed gas, a molar flow rate Gmixw of the moisture in the mixed gas. Also, the molar flow rate Gmixw can be calculated by the use of a known relational formula that includes, as its parameter, a mass flow rate of the moisture in the mixed gas. The molar flow rate Gmixall can be calculated by the use of a known relational formula that includes, as its parameters, an EGR gas flow rate GEGR, an exhaust gas flow rate GEX and the following parameters (that is, molar flow rates of moisture, nitrogen $N_2$, oxygen $O_2$ and carbon dioxide $CO_2$ in the fresh air, and molar flow rates of moisture, nitrogen $N_2$, oxygen $O_2$ and carbon dioxide $CO_2$ in the exhaust gas). Then, the individual parameters descried above that constitute these molar flow rate Gmixw and molar flow rate Gmixall can be calculated, by the use of known relational formulae, with the actual EGR rate, the air-fuel ratio, an intake air flow rate GWE, the atmospheric air pressure CP, an atmospheric relative humidity RH and an atmospheric air temperature TD being detected or calculated. It should be noted that the intake air flow rate GWE can be detected by the use of the air flow sensor 18. The atmospheric relative humidity RH can be detected by the use of the humidity sensor 20. The atmospheric air pressure CP and the atmospheric air temperature TD can be detected by the use of respective sensors that are not shown. The actual EGR rate can be calculated on the basis of, for example, parameters, such as the opening degree of the EGR valve 42, the intake air flow rate GWE and the engine speed. The EGR gas flow rate GEGR can be calculated on the basis of the intake air flow rate GWE and the actual EGR rate. The exhaust gas flow rate GEX can be calculated on the basis of the intake air flow rate GWE, a dry air flow rate (which is the flow rate associated with the temperature and humidity of a supposed fresh air) based on the intake air flow rate GWE and the air-fuel ratio.

Next, the ECU 50 determines whether or not the condensed water occurrence condition is met (step S102). In this step S102, the ECU 50 determines whether or not the condensed water occurrence condition is met, on the basis of, as an example, whether or not the dew point td calculated in step S100 is higher than the temperature of the wall surface 26a inside the intercooler 26 during the engine operation with EGR. The temperature of the cooler-cooling water detected by the use of the cooler water temperature sensor 30 is herein substituted for the temperature of the wall surface 26a used for this determination.

If the condensed water occurrence condition is not met in step S102, the ECU 50 makes zero a control correction amount P that is calculated by the processing of step S110 described later (step S104).

If, on the other hand, the condensed water occurrence condition is met in step S102, the ECU 50 calculates an amount of occurrence of the condensed water (hereafter, simply referred to as a "condensed water amount W") (step S106). The condensed water amount W (g/s) can be calculated by the use of the following formula 3. Also, a saturation water vapor pressure E(t) in formula 3 can be calculated by the use of the following formula 4.

$$W = W0 - \frac{E(t)}{Pim} \quad (3)$$

$$E(t) = 0.611 * 10^{7.5t/(t+237.3)} \quad (4)$$

W0: Amount of moisture in mixed gas (which can be calculated as a value depending on the sum (i.e., the mass flow rate of the mixed gas) of the intake air flow rate GWE detected by the use of the air flow sensor 18 and the EGR gas flow rate GEGR described above)
t: Temperature of the wall surface 26a of the intercooler 26 (cooler-cooling water temperature)

Next, the ECU estimates the particle size of the condensed water (step S108). In the ECU 50, a relationship as shown in FIG. 5 described above is stored as a map. In this step S108, the ECU 50 calculates an estimated value of the particle size (in more detail, the above-described level values of the particle size) depending on the intake air flow velocity and the temperature difference Δt from this kind of map. The sum (i.e., the mass flow rate of the mixed gas) of the intake air flow rate GWE detected by the use of the air flow sensor 18 and the EGR gas flow rate GEGR described above is herein substituted for the intake air flow velocity in this calculation. In addition, as described above, the temperature difference Δt is a difference between the dew point td and the temperature of the wall surface 26a. A value obtained by subtracting the cooler-cooling water temperature from the dew point td is herein used as the temperature difference Δt. It should be noted that, since this estimation of the particle size in step S108 is performed when the condensed water occurrence condition is met in step S102 (dew point td>cooler-cooling water temperature), the temperature difference Δt has a positive value.

Next, the ECU 50 calculates the control correction amount P of the engine control parameter that affects the combustion stability (step S110). As described above, the example of the engine control parameter that is subject to the correction in the present embodiment is the EGR rate. In this step S110, the control correction amount P that is a correction amount of the target EGR rate is calculated on the basis of the condensed water amount W that is calculated in step S106 and the particle size that is calculated in step S108. In more detail, as described above, the control correction amount P is calculated so as to be greater when the condensed water amount W is greater. Moreover, as described above with reference to FIG. 6, the control correction amount P is calculated so as to be greater when the particle size calculated in step S108 is greater.

Next, the ECU 50 determines a final control amount Tf of the target EGR rate (step S112). This final control amount Tf is calculated as a value that is obtained by subtracting, from a base control amount Tb corresponding to the base EGR rate described above, the control correction amount P that is calculated in step S110. As just described, the final control amount Tf corresponds to a target EGR rate that has been corrected so as to be lower with the condensed water amount W and particle size of the condensed water taken into consideration. Also, according to this final control amount Tf, the greater the control correction amount P is, the lower the target EGR rate becomes.

In further addition to this, the ECU 50 controls the opening degree of the EGR valve 42 such that the actual EGR rate approaches the final control amount Tf (i.e., a corrected target EGR rate) calculated by the processing of the routine shown in FIG. 7. Moreover, in the engine control of the present embodiment, as a premise, an advance of the spark timing is performed such that, when the EGR rate is increased, the combustion fluctuation does not increase as a result of an increase of the EGR rate. In the example with this kind of premise adopted, there is a concern that, if the spark timing is not changed when the EGR rate is decreased in response to the occurrence of the condensed water, knocking may become likely to occur depending on the intake air temperature. Accordingly, if the premise described above is adopted and the EGR rate is caused to decrease in accordance with the processing of the routine shown in FIG. 7, a retard of the spark timing may alternatively be performed for reduction of knocking.

4. Advantageous Effects of Engine Control According to First Embodiment in Condensed Water Occurrence Condition According to the processing of the routine shown in FIG. 7 described so far, if the condensed water occurrence condition is met, the EGR rate is caused to decrease in accordance with the control correction amount P that is changed depending on the condensed water amount W and the particle size (that is, the opening degree of the EGR valve 42 is controlled so as to improve the combustion stability). Thus, a decrease of the combustion stability (i.e., an increase of the combustion fluctuation) associated with an inflow of the condensed water can be reduced.

To be more specific, according to the processing of the routine described above, the control correction amount P of the EGR rate is changed by taking into consideration not only the condensed water amount W but also the particle size of the condensed water. There is a concern that, if, contrary to the present embodiment, the correction amount of the engine control parameter, such as the EGR rate is determined without focusing on the particle size of the condensed water in the condensed water occurrence condition, this correction may be performed insufficiently or excessively. Insufficiency of the correction may lead to an increase of the combustion fluctuation including the occurrence of misfire. Moreover, there is the possibility that, depending on the intake air temperature, an excessive correction of, for example, the EGR rate may cause knocking to be likely to occur. In contrast to this, according to the control of the present embodiment, since the effects of the difference of the particle size of the condensed water on the combustion fluctuation (i.e., the combustion stability) is taken into consideration for the control correction amount P, the EGR rate can be corrected more appropriately such that the combustion stability is ensured in the condensed water occurrence condition.

5. Other Engine Control Parameter Subject to Correction

In the first embodiment described above, the EGR rate is taken as an example of the engine control parameter that is controlled so as to improve the combustion stability when the condensed water occurrence condition is met. However, this kind of engine control parameter may not always be the EGR rate that can change by the control of the actuator (e.g., EGR valve 42), and may alternatively be, for example, a spark energy or the spark timing that can change by the control of the ignition device 56 that is another example of actuators according to the present disclosure.

To be more specific, in an example in which the spark energy is used instead of the EGR rate, the ignition device 56 may be controlled so as to more increase the spark energy (that is, so as to more improve the combustion stability) when the particle size of the condensed water is greater. Moreover, in an example in which the spark timing is used instead of the EGR rate, the ignition device 56 may be controlled so as to more advance the spark timing (that is, so as to more improve the combustion stability) when the particle size of the condensed water is greater. It should be noted that the spark energy can be increased by, for example, charging a condenser after completion of discharge and thereafter discharging again. Alternatively, if a plurality of ignition coil are provided, the spark energy can be increased by increasing the number of ignition coils to be used for discharging.

Second Embodiment

Next, a second embodiment according to the present disclosure will be described with reference to FIGS. 8 to 11.

1. System Configuration According to Second Embodiment

In the following description, it is assumed that the configuration shown in FIG. 1 is used as an example of the system configuration according to the second embodiment.

2. Causes of Variation Between Cylinders of Condensed Water Inflow Amount

In an internal combustion engine that includes a plurality of cylinders as with the internal combustion engine 10, the amount of the condensed water that flows into each cylinder from an intake channel is not always constant, and may be variable due to, for example, two causes 1 and 2 of variation between cylinders described below.

2-1. Cause 1 of Variation Between Cylinders (Temperature Distribution Inside Intercooler)

Figure 8:
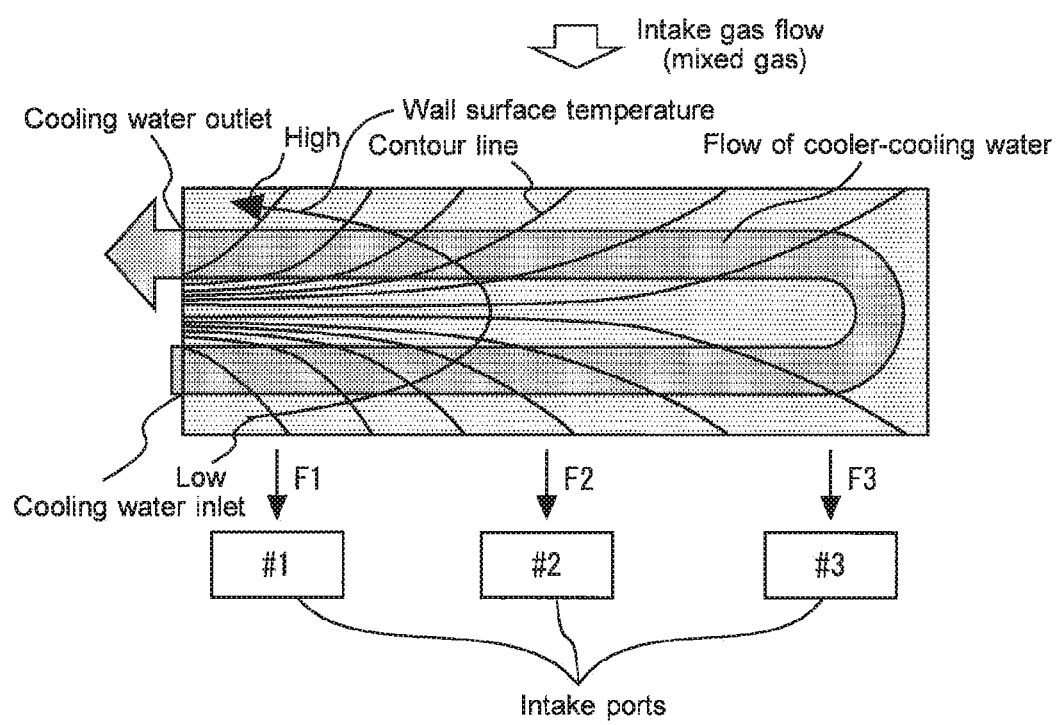
FIG. 8 is a diagram that illustrates an example of a temperature distribution inside an intercooler.

FIG. 8 is a diagram that illustrates an example of the temperature distribution inside the intercooler. Curved lines in FIG. 8 correspond to contour lines of the temperature of the inner wall surface of an intercooler. The temperature of cooler-cooling water that flows inside the intercooler becomes the lowest at a cooling water inlet of the intercooler. Moreover, since heat exchange between the cooler-cooling water and the intake gas progresses in association with progress of the flow of the cooler-cooling water, the temperature of the cooler-cooling water becomes higher at a position closer to the cooling water outlet. Thus, as shown in FIG. 8, the temperature of the inner wall surface of the intercooler becomes the lowest in the vicinity of the cooling water inlet, and becomes higher at a position closer to the cooling water outlet.

Figure 9:
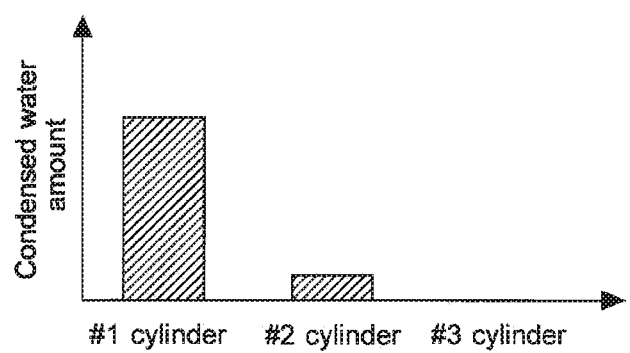
FIG. 9 is a graph for describing the difference of the amount of the condensed water that flows into each cylinder of an internal combustion engine that includes the intercooler having the temperature distribution shown in FIG. 8.

FIG. 9 is a graph for describing the difference of the amount of the condensed water that flows into each cylinder of an internal combustion engine that includes the intercooler having the temperature distribution shown in FIG. 8. In the intercooler having the temperature distribution of its inner wall surface as in the example shown in FIG. 8, an intake gas F1 that passes through a portion located near the cooling water inlet (that is, a portion located on the left side in FIG. 8) is the easiest to be cooled, followed by an intake gas F2 that passes through a portion located in the center. Also, an intake gas F3 that passes through a portion located on the right side is the most difficult to be cooled. As a result, the condensed water becomes most likely to occur at the portion located on the left side, and it becomes the second most likely to occur at the portion located in the center. Also, the condensed water becomes least likely to occur at the portion on the right side.

Based on the above, as shown in FIG. 9, the amount of inflow of the condensed water becomes the greatest at a cylinder #1 located on the downstream side of the intake gas flow F1, and it becomes the second greatest at a cylinder #2 located on the downstream side of the intake gas flow F2. Also, the amount of inflow of the condensed water becomes the smallest at a cylinder #3 located on the downstream side of the intake gas flow F3. It should be noted that, in the example shown in FIG. 9, no condensed water is produced in the cylinder #3.

2-2. Cause 2 of Variation Between Cylinders (Shape of Intake Channel Around Intercooler)

Figure 10:
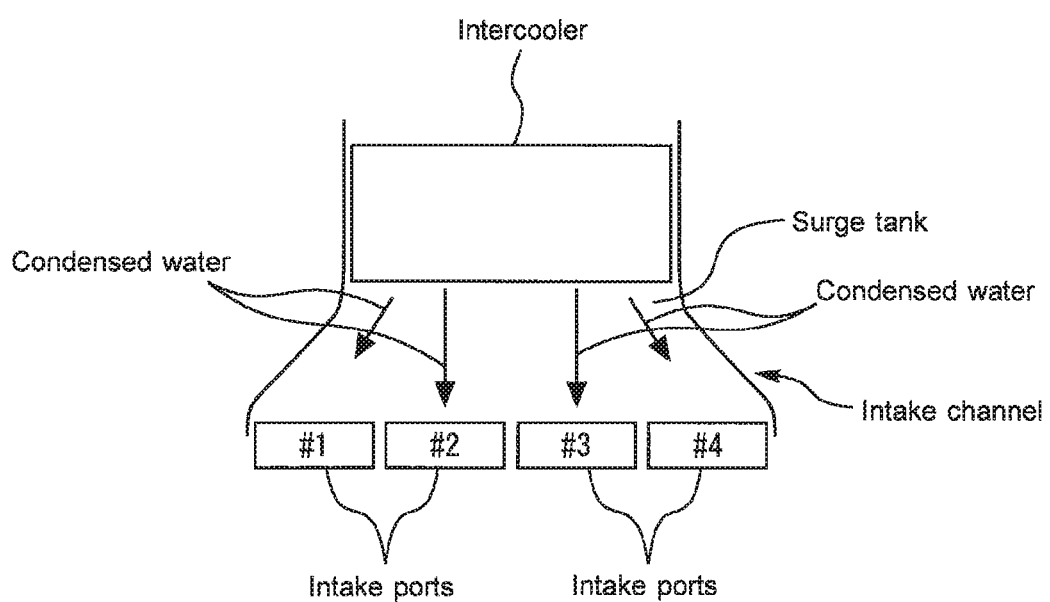
FIG. 10 is a diagram that illustrates an example of the flow of intake gas that flows into each cylinder from an intercooler.

FIG. 10 is a diagram that illustrates an example of the flow of the intake gas that flows into each cylinder from an intercooler. FIG. 10 shows an example of an in-line four cylinder engine. The condensed water that flows out from the intercooler along with the intake gas is likely to flow straight. Thus, if the width of the intercooler (the width in the right and left direction in FIG. 10) is shorter than the total width of intake ports as in the example of the shape shown in FIG. 10), the condensed water becomes likely to flow into cylinders located so as to be opposed to the outlet of the intake gas in the intercooler (in the example shown in FIG. 10, two cylinders #2 and #3 located on the center side). Thus, in this example, the amount of the condensed water that flows into the cylinders #2 and #3 become greater than the amount of the condensed water that flows into cylinders #1 and #4 located near opposite ends.

3. Engine Control According to Second Embodiment in Condensed Water Occurrence Condition The engine control according to the present embodiment in the condensed water occurrence condition is similar to that according to the first embodiment in a point that the control correction amount P is caused to change depending on the condensed water amount (occurrence amount) W and the particle size of the condensed water. On that basis, in the present embodiment, the control correction amount P is determined with the variation between cylinders of the condensed water inflow amount taken into consideration.

3-1. Correction of Engine Control Parameter with Variation Between Cylinders of Condensed Water Inflow Amount Taken into Consideration If there is a variation between cylinders concerning the condensed water inflow amount as described above, the degree of the effects of the inflow of the condensed water on the combustion becomes different from each other between cylinders. In more detail, it can be said that the effects of the difference of the particle size of the condensed water on the combustion also becomes greater when the condensed water inflow amount is greater. Thus, if, although there is this kind of variation between cylinders, correction is performed with a constant amount in each cylinder without this variation taken into consideration, the correction may be performed insufficiently or excessively. More specifically, there is the possibility that an insufficiency correction may occur at one or more cylinders into which the condensed water is easier to flow and, conversely, an excessive correction may occur at one or more cylinders into which the condensed water is harder to flow.

It can be grasped in advance by, for example, experiment that the variation between cylinders of the condensed water inflow amount due to the above-described temperature distribution inside the intercooler and the shape of the intake channel around the intercooler. Accordingly, the ECU 50 stores, for each cylinder (in the internal combustion engine 10, for each of cylinders #1 to #3), a condensed water inflow amount ratio map that defines each ratio of the condensed water inflow amount of the individual cylinders associated with the degree of the variation between cylinders.

Furthermore, in the present embodiment, the control correction amount Pn is calculated for each cylinder, on the basis of the condensed water inflow amount ratio map described above (this sign "n" attached to "P" corresponds to cylinder numbers). In more detail, based on the condensed water inflow amount ratio map, the control correction amount Pn in one or more cylinders in which the condensed water inflow amount is greater is more increased than that in one or more cylinders in which the condensed water inflow amount is smaller.

Figure 11:
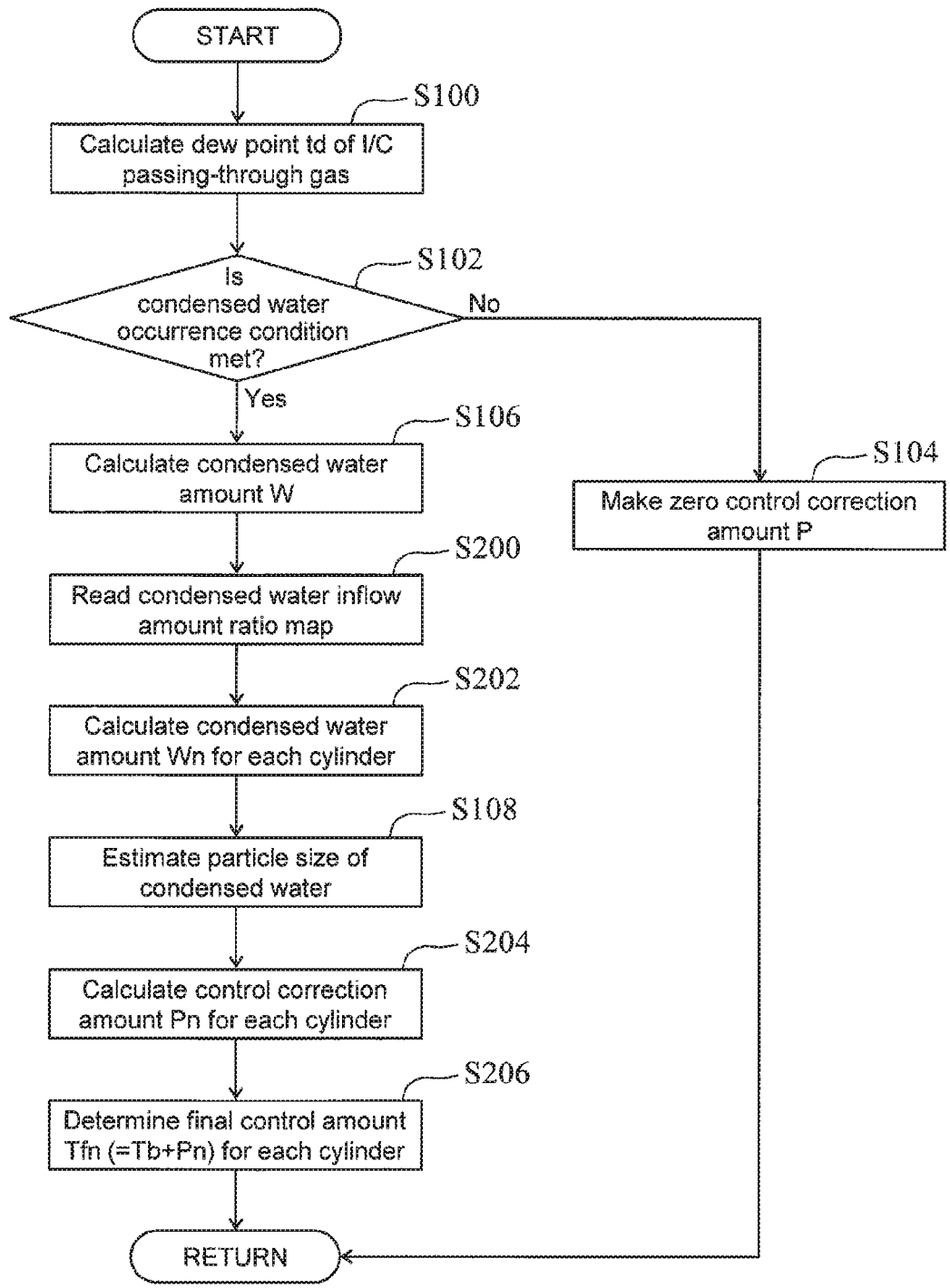
FIG. 11 is a flow chart that illustrates a routine of processing concerning an engine control according to a second embodiment of the present disclosure.

3-2. Processing of ECU Concerning Engine Control According to Second Embodiment in Condensed Water Occurrence Condition FIG. 11 is a flow chart that illustrates a routine of the processing concerning the engine control according to the second embodiment of the present disclosure. The processing of steps S100 to S108 in the routine shown in FIG. 11 is as already described in the first embodiment.

According to the routine shown in FIG. 11, if the condensed water occurrence condition is met in step S102, the ECU 50 reads the condensed water inflow amount ratio map described above after calculating the condensed water amount (occurrence amount) W in step S106 (step S200). The condensed water inflow amount ratio in each cylinder may change in accordance with an engine operating condition (for example, the engine load and the engine speed). Thus, the condensed water inflow amount ratio map is determined so as to have map values that are different depending on the engine operating condition.

Next, the ECU 50 calculates the condensed water amount Wn for each cylinder (this sign "n" attached to "P" corresponds to cylinder numbers) (step S202). In detail, the ECU 50 calculates (estimates) the condensed water amount Wn for each cylinder on the basis of the condensed water amount W that is calculated in step S106 and the condensed water inflow amount ratio in each cylinder at the current engine operating condition based on the condensed water inflow amount ratio map. In other words, the condensed water amount W is distributed into the condensed water amounts Wn of the individual cylinders on the basis of the condensed water inflow amount ratio.

Next, the ECU 50 calculates the particle size of the condensed water in step S108 and then calculates the control correction amounts Pn of the individual cylinders (step S204). In detail, the control correction amounts Pn of the individual cylinders are changed in accordance with the condensed water amount (occurrence amount) W and the particle size of the condensed water, as with the control according to the first embodiment. On that basis, the control correction amounts Pn are caused to be different between cylinders on the basis of the current condensed water inflow amount ratio. In more detail, as already described, the control correction amount Pn in one or more cylinders in which the condensed water inflow amount Wn is greater is more increased than that in one or more cylinders in which the condensed water inflow amount Wn is smaller (including a cylinder in which the condensed water inflow amount Wn is zero).

Next, the ECU 50 determines the final control amount Tfn for each cylinder (step S206). The engine control parameter that is subject to correction by the present routine is assumed to be the spark energy, as an example. The final control amount Tfn for each cylinder is calculated as a value obtained by adding, to the base control amount Tb equivalent to the base value of the spark energy, the control correction amount Pn for each cylinder calculated in step S204. According to the final control amount Tfn calculated in this way, the spark energy is more increased when the control correction amount Pn is greater. It should be noted that the base value of the spark energy may be a fixed value or may be changed in accordance with the engine operating condition (for example, the engine load and the engine speed). In addition, as the engine control parameter subject to correction, the spark timing, for example, may be used instead of the spark energy. In the example of the spark timing, the spark timing may be controlled, with an advance of the spark timing, so as to improve the combustion stability.

4. Advantageous Effects of Engine Control According to Second Embodiment in Condensed Water Occurrence Condition According to the processing of the routine shown in FIG. 11 described so far, the processing to calculate the control correction amount Pn for each cylinder with the variation between cylinders of the condensed water inflow amount taken into consideration is added to the processing of the routine shown in FIG. 7 according to the first embodiment. According to this kind of processing, the effects, on the combustion fluctuation (i.e., the combustion stability), of the variation between cylinders of the condensed water inflow amount can be reflected in the control of the engine control parameter, such as the spark energy. Thus, if there is the variation between cylinders of the condensed water inflow amount, the engine control parameter that affects the combustion stability can be corrected more appropriately as compared to the engine control according to the first embodiment.

Other Embodiments (Engine Control Intended for Condensed Water Produced in EGR Cooler)

In the first and second embodiments described above, the particle size estimation processing that estimates the particle size of the condensed water that flows into each cylinder from the intake channel 12 is performed for the condensed water produced inside the intercooler 26 (more specifically, the internal intake channel 12c of the intercooler 26).

However, points of occurrence of condensed water that flows into each cylinder from the intake channel 12 may not always be the intercooler 26. That is, when, for example, the exhaust gas is cooled by the EGR cooler 44 before being introduced into the intake channel 12 as the EGR gas, condensed water may be produced, and a produced condensed water may flow into each cylinder via the EGR channel 40 and the intake channel 12.

Accordingly, a similar particle size estimation processing may alternatively be performed for the condensed water produced in the EGR cooler 44 (more specifically, a portion of the EGR channel 40 inside the EGR cooler 44). In more detail, the particle size of the condensed water in this example may be estimated by the use of a relationship similar to the relationship shown in FIG. 5, on the basis of at least one of the flow velocity of the EGR gas that passes through the EGR cooler 44, and a temperature difference $\Delta t'$ between the dew point of the EGR gas and the wall surface temperature of the EGR channel 40 inside the EGR cooler 44. Also, in a particle size estimation processing in this example, the EGR gas flow rate GEGR, for example, can be substituted for the flow velocity of the EGR gas. Moreover, the dew point used for calculation of the temperature difference $\Delta t'$ can be calculated by the use of a formula which is similar to formula 1 but is intended for only the EGR gas. The temperature of the cooler-cooling water that flows through the EGR cooler 44 can be, for example, substituted for the wall surface temperature described above used for calculation of the temperature difference $\Delta t'$.

Moreover, in the example intended for the condensed water produced in the EGR cooler 44, the correction amount of the engine control parameter which is controlled may be determined in a manner similar to that for the example intended for the condensed water produced in the intercooler 26, on the basis of the particle size of the condensed water that can be estimated as described above or on the basis of the particle size and the condensed water amount. Furthermore, the engine control parameter may alternatively be corrected, with both of the condensed water produced in the intercooler 26 and the condensed water produced in the EGR cooler 44 taken into consideration, in accordance with at least the particle size of the particle size and the condensed water amount.

(Engine Control Intended for Condensed Water Produced in Intake Ports)

Moreover, points of occurrence of condensed water that flows into each cylinder from the intake channel 12 may not always be the intake channel 12 or the EGR channel 40 provided inside a cooler, such as the intercooler 26 or the EGR cooler 44. That is, even if an internal combustion engine does not include a cooler in at least one of an intake channel and an EGR channel, when the intake gas (the mixed gas of the fresh air and the EGR gas) is cooled by the wall surface of the intake channel 12 located on the downstream side of the connection point of the EGR channel 40 during, for example, engine warm-up after a cold start-up, condensed water may be produced, and a produced condensed water may flow into each cylinder.

Accordingly, a particle size estimation processing similar to that in the example of the intercooler 26 may alternatively be performed for the condensed water produced in the intake ports 12b. In more detail, the particle size of the condensed water in this example may be estimated by the use of a relationship similar to the relationship shown in FIG. 5, on the basis of at least one of the flow velocity of the mixed gas that flows through the intake ports 12b, and a temperature difference $\Delta t''$ between the dew point of the mixed gas and the wall surface temperature of the intake ports 12b. Also, in the particle size estimation processing in this example, as in the example of the intercooler 26, the flow rate of the mixed gas can be substituted for the flow velocity of the mixed gas. Moreover, the dew point used for calculation of the temperature difference $\Delta t''$ can be calculated basically, by the use of a manner similar to that in the example of the intercooler 26, with the wall surface temperature "t" being replaced with the wall surface temperature of the intake ports 12b described below. The wall surface temperature (the port wall temperature) of the intake port 12b can be calculated by the use of, for example, a manner described below with reference to FIG. 12.

Figure 12:
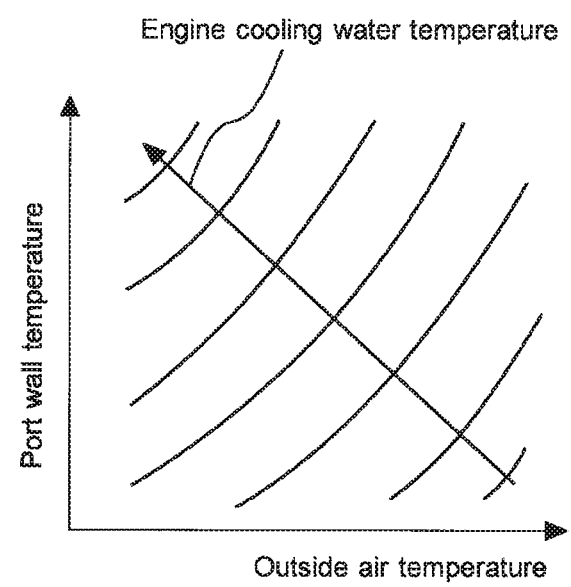
FIG. 12 is a graph for describing a calculation manner of the wall surface temperature of an intake port.

FIG. 12 is a graph for describing a calculation manner of the wall surface temperature of the intake port 12b. In FIG. 12, a relationship of the port wall temperature with respect to the outside air temperature and the engine cooling water temperature is represented. This relationship is associated with an engine warm-up process in which the engine cooling water temperature continuously increases with a lapse of time. As shown in FIG. 12, under the same engine cooling water temperature, the higher the outside air temperature is, the higher the port wall temperature in the engine warm-up process becomes. Also, under the same outside air temperature, the higher the engine cooling water temperature is, the higher the port wall temperature in the engine warm-up process becomes. A relationship as shown in FIG. 12 is stored in the ECU 50 as a map, whereby the port wall temperature can be calculated during an engine warm-up on the basis of the outside air temperature and the engine cooling water temperature. It should be noted that the engine cooling water temperature can be obtained by the use of, for example, a temperature sensor that is not shown, and that the outside air temperature can be obtained by the use of, for example, an outside air temperature sensor (not shown) mounted on the vehicle.

Furthermore, in the example intended for the condensed water produced in the intake ports 12b, the correction amount of the engine control parameter which is controlled may be determined in a manner similar to that in the example intended for the condensed water produced in the intercooler 26, on the basis of the particle size of the condensed water that can be estimated as described above or on the basis of the particle size and the condensed water amount.

(Example of Correction of Engine Control Parameter without Estimation of Particle Size of Condensed Water)

Contrary to the examples in the first and second embodiments described above, the ECU 50 may increase, without calculating the estimated value of the particle size of the condensed water, the correction amount for correcting the engine control parameter so as to more improve the combustion stability when the flow velocity of the intake gas that flows through the point of occurrence of an arbitrary condensed water is lower. As described with reference to FIGS. 4A and 4B, there is a correlation between the flow velocity of the intake gas and the particle size of the condensed water. Thus, with the correction amount of the engine control parameter being changed in accordance with the flow velocity of the intake gas in the condensed water occurrence condition, it becomes possible to perform an engine control in which the particle size of the condensed water is taken into consideration for ensuring the combustion stability in the condensed water occurrence condition.

(Other Example Concerning Estimation of Particle Size)

In the first and second embodiments described above, the ECU 50 estimates the particle size of the condensed water on the basis of both of the intake air flow rate and the temperature difference Δt. However, the particle size of the condensed water may alternatively be estimated on the basis of at least one of the flow velocity of the intake gas that flows through the point of occurrence of the condensed water and the difference between the dew point of the intake gas and the wall surface temperature of the point of occurrence.

(Other Example Concerning Correction of Engine Control Parameter)

According to the examples in the first and second embodiments described above, the correction amount of the engine control parameter is changed in accordance with both of the condensed water amount W and the particle size. However, a correction processing for correcting the engine control parameter so as to improve the combustion stability may alternatively be performed on the basis of only the particle size of the condensed water.

(Other Example Concerning Connection Point of EGR Channel)

Moreover, in the first and second embodiments described above, the internal combustion engine 10 that includes the LPL type EGR device 38 is taken an example. However, in an example in which an internal combustion engine according to the present disclosure includes an intercooler, an alternative EGR device may be used, as far as an EGR channel that connects a portion of an intake channel located on the upstream side of the intercooler and an exhaust channel is provided. More specifically, a connection point of the EGR channel with respect to the intake channel (that is, a point at which the EGR gas is introduced into the intake channel) may not always be provided upstream of a compressor as with the example of the internal combustion engine 10, and may alternatively be provided at, for example, a portion located on the downstream side of the compressor and between a throttle valve and the intercooler. Furthermore, a connection point of the EGR channel with respect to the exhaust channel (that is, a point at which exhaust gas in the exhaust channel is supplied, as the EGR gas, into the EGR channel) may not always be provided downstream of a turbine, and may be provided at an arbitrary portion of the exhaust channel.

Furthermore, the embodiments and modifications described above may be combined in other ways than those explicitly described above as required and may be modified in various ways without departing from the scope of the present disclosure.

It should be noted that, in the first and second embodiments described above, the processing of step S108 executed by the ECU 50 corresponds to a "particle size estimation processing" according to one aspect of the present disclosure. Also, in the first embodiment, the processing of steps S110 and S112 corresponds to a "correction processing" according to one aspect of the present disclosure, and, in the second embodiment, the processing of steps S204 and S206 corresponds to a "correction processing" according to one aspect of the present disclosure.

What is claimed is:

1. A control device for an internal combustion engine, the internal combustion engine including:
    at least one cylinder;
    an EGR device that includes an EGR channel configured to connect an intake channel and an exhaust channel; and
    an actuator used for control of an engine control parameter that affects combustion stability of the internal combustion engine,
    wherein the control device is configured to:
    perform, if a condensed water occurrence condition in which a condensed water occurs in at least one of the intake channel and the EGR channel is met, a particle size estimation processing that estimates a particle size of the condensed water that flows into the at least one cylinder from the intake channel; and
    perform, if the condensed water occurrence condition is met, a correction processing that corrects the engine control parameter so as to improve the combustion stability, and
    wherein, in the correction processing, the control device increases a correction amount of the engine control parameter by a greater amount when the particle size estimated by the particle size estimation processing is greater.

2. The control device according to claim 1,
    wherein, in the particle size estimation processing, the control device estimates that the particle size is greater when a flow velocity of intake gas that flows through a point of occurrence of the condensed water is lower.

3. The control device according to claim 1,
    wherein, in the particle size estimation processing, the control device estimates that the particle size is greater when a difference between a dew point of intake gas that flows through a point of occurrence of the condensed water and a wall surface temperature of the point of occurrence is greater.

4. The control device according to claim 1,
    wherein the at least one cylinder includes a plurality of cylinders,
    wherein, if the condensed water occurrence condition is met, the control device performs processing to estimate, for each cylinder, an amount of the condensed water that flows into each of the plurality of cylinders from the intake channel, and
    wherein, in the correction processing, the control device increases the correction amount by a greater amount in one or more cylinders in which the estimated amount of the condensed water is greater, as compared to that in one or more cylinders in which the estimated amount of the condensed water is smaller.

5. A control device for an internal combustion engine, the internal combustion engine including:
    at least one cylinder;
    an EGR device that includes an EGR channel configured to connect an intake channel and an exhaust channel; and
    an actuator used for control of an engine control parameter that affects combustion stability of the internal combustion engine,
    wherein, if a condensed water occurrence condition in which a condensed water occurs in at least one of the intake channel and the EGR channel is met, the control device increases a correction amount for correcting the engine control parameter by a greater amount so as to improve the combustion stability when a flow velocity of intake gas that flows through a point of occurrence of the condensed water is lower.

* * * * *